(12) United States Patent
Okui et al.

(10) Patent No.: US 6,460,996 B2
(45) Date of Patent: Oct. 8, 2002

(54) EYEGLASSES

(75) Inventors: Kenji Okui, Osaka; Kazuto Yasuhara, Higashiosaka, both of (JP)

(73) Assignee: Yamamoto Kogaku Co., Ltd., Osaka (JP)

( * ) Notice: Subject to any disclaimer, the term of this patent is extended or adjusted under 35 U.S.C. 154(b) by 0 days.

(21) Appl. No.: 10/054,588

(22) Filed: Jan. 22, 2002

(65) Prior Publication Data

US 2002/0109818 A1 Aug. 15, 2002

(30) Foreign Application Priority Data

Jan. 22, 2001 (JP) ........................................ 2001-013502

(51) Int. Cl.[7] .............................. G02C 1/08; G02C 1/04
(52) U.S. Cl. .......................... 351/86; 351/106; 351/41
(58) Field of Search .............................. 351/41, 86, 83, 351/103, 106

(56) References Cited

U.S. PATENT DOCUMENTS

| 5,602,603 A | 2/1997 | Bondet | ........................ 351/41 |
| 6,186,623 B1 * | 2/2001 | Giacomuzzo | ............... 351/106 |

* cited by examiner

Primary Examiner—Hung Xuan Dang
(74) Attorney, Agent, or Firm—Koda & Androlia

(57) ABSTRACT

Eyeglasses include a right and a left rim member connected with a bridge. A groove extends from an inside area to an upper and lower areas of each of the rim members, and a lens is inserted in the groove at its inside, upper and lower edges. The lens is slidable laterally outwards to be detached from the rim member and inwards to be fitted therein. Therefore the lens can be easily changed, but not prone to come off inadvertently.

12 Claims, 6 Drawing Sheets

EYEGLASSES

BACKGROUND OF THE INVENTION

1. Field of the Invention

The present invention relates to eyeglasses, more particularly sunglasses, with double lenses (right-left discrete type lenses).

2. Prior Art

Recently, sunglasses with right and left lenses, respectively exchangeable depending on purposes, have been available in the market. An example of this type is shown in FIG. 6. As shown in the drawing, the rim members 90 of the sunglasses are provided with lens holding sections 92 which hold only the right and left portions of the respective lenses 91. At the time of exchanging lenses, the lenses are detached from and attached to the lens holding sections 92 by force.

However, in the foregoing sunglasses, the right and left portions of the lenses 91 to be held by the lens holding sections 2 have rather sharply curved configurations and extend relatively wide. This construction makes it rather troublesome to exchange lenses.

A possible way to solve the foregoing problem is making portions of the lenses to be held by the lens holding sections 92 narrower or using elastic material as the lens holding sections 92. However, this may be liable to cause inadvertent drop of the lenses.

SUMMARY OF THE INVENTION

It is, therefore, an object of the present invention to provide eyeglasses in which right and left lenses are easily exchanged and do not inadvertently drop off.

The eyeglasses according to the present invention include a right rim member, a left rim member and a bridge connecting the right and left rim members together. Each of the rim members has a groove extending from an inside area to an upper and a lower area. Respective lenses are, at their inside, upper and lower edges, fitted in the grooves of the rim members, and the lenses are laterally slidable, outwards to be removed and inwards to be attached.

In the eyeglasses according to the present invention, the lenses may have notches which engage with engaging protrusions provided in the grooves. This engagement provides resistance against an inadvertent drop off of the lenses from the eyeglasses.

In the eyeglasses according to the present invention, the rim members have, near nose pieces, openings for letting air in and out from between a wearer's face and the lenses.

In the eyeglasses according to the present invention, the rim members have cuttings at the portions corresponding to the peripheral areas of the lenses which are not fitted in the grooves, through which the air coming in from the openings is discharged.

The eyeglasses according to the present invention may use spherical lenses.

The above and other objects, features and advantages of the present invention will become apparent from the following description read in conjunction with the accompanying drawings, in which like reference numerals designate the same elements.

DETAILED DESCRIPTION OF THE INVENTION

Figure 1:
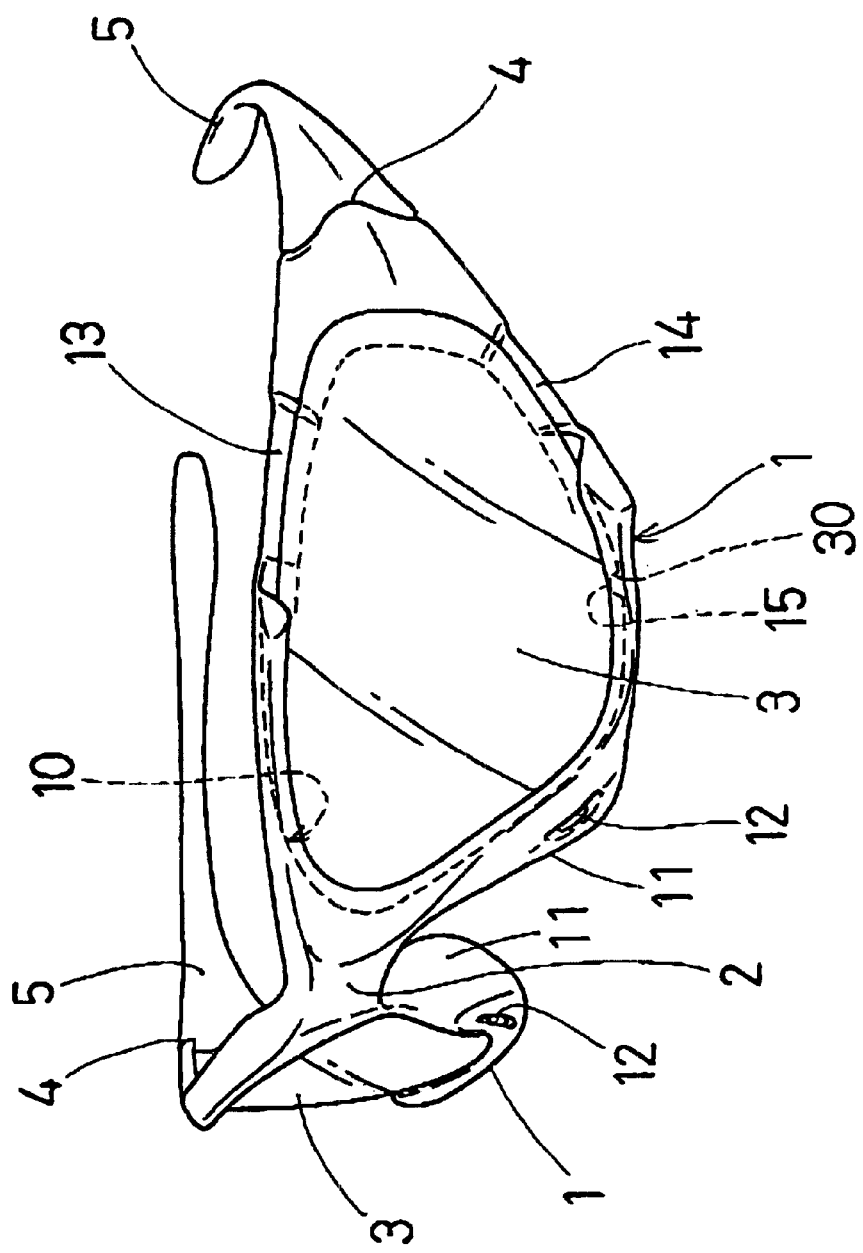
FIG. 1 is a perspective view of a pair of sunglasses according to one embodiment of the present invention.
Figure 2:
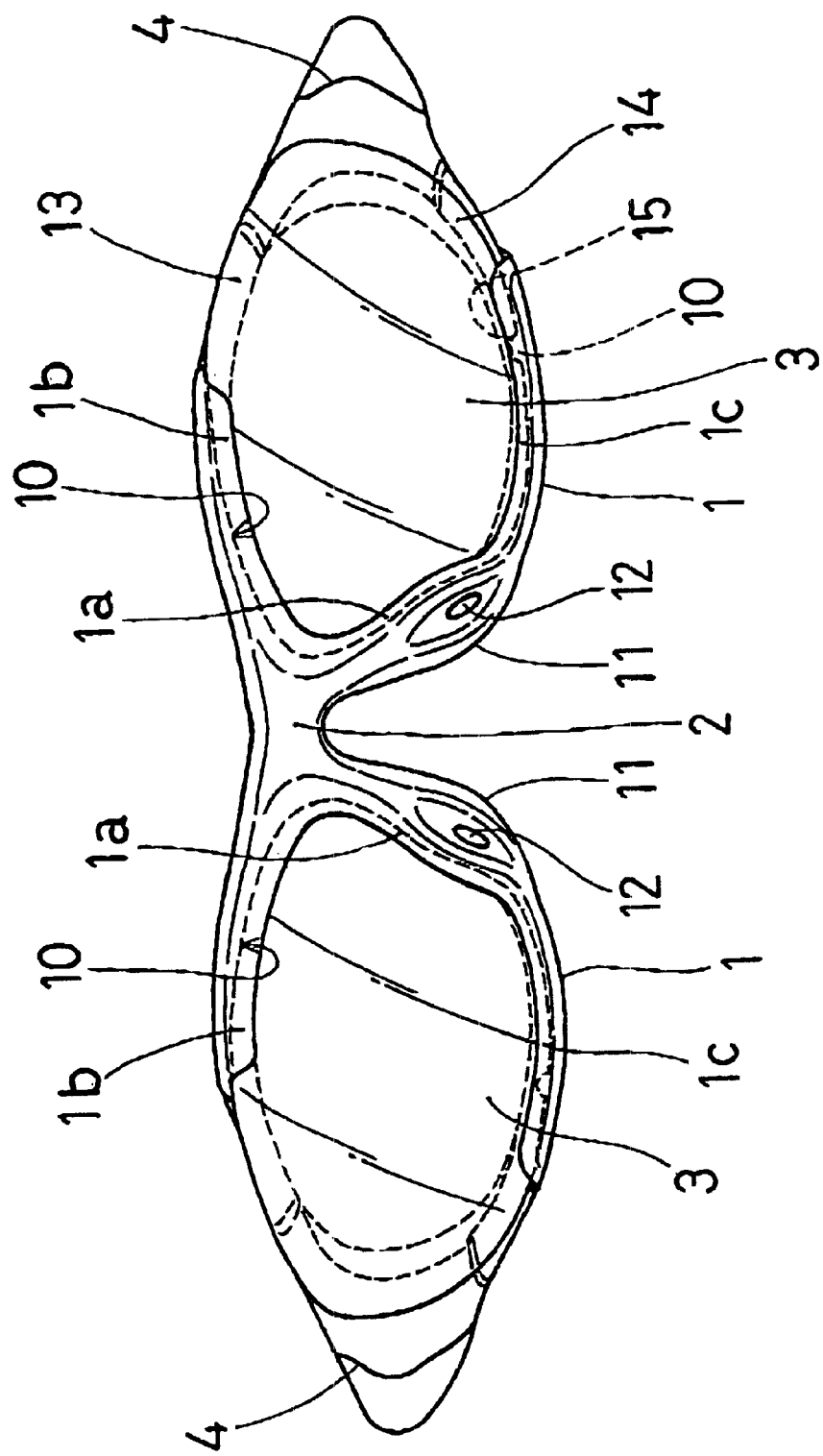
FIG. 2 is a front view of the sunglasses.

FIG. 1 is a perspective view of a pair of sunglasses according to the present invention, and FIG. 2 is a front view thereof.

The construction of the sunglasses is now described below.

As shown in FIG. 1, the sunglasses include a right and a left rim member 1 and 1 in which lenses 3 are to be fitted, and a bridge 2 connecting the rim members 1 and 1 together. Each of the outer ends of the rim members (the left end of the left rim member and the right end of the right rim member) is provided with a temple 5 through a hinge 4 to make them foldable. The lenses 3 are detachable with respect to the rim members 1.

Each rim member 1, as shown in FIGS. 1 and 2, has a thicker portion which extends from an inside area 1a (the area opposed to the outer ends) to an upper area 1b and a lower area 1c. This thicker portion has a groove 10 in which a lens portion from an inside edge to an upper and a lower edge is inserted. The groove 10 ends open laterally outside in order to allow the lens 3 to be inserted therein and remove therefrom. An opening 12 is provided in the vicinity of each nose piece 11. Furthermore cuttings 13, 14 for letting air out are provided on the rim member 1 at the positions near the upper and lower open ends of the groove 10 (more specifically, at the positions of the rim member which face the lens spherical portion not in the groove).

The bridge 2 connects the rim members 1 and 1 in an arc fashion so that the three extend along the contour of a wearer's face when seen from above.

Each of lenses 3 is spherical and attached in a fashion that a lens peripheral portion extending from the inside edge to the upper and the lower edge is fitted in the groove 10. Various kinds of lenses, such as transparent lenses, colored lenses, lenses for cutting light with a specific wavelength, polarizing lenses and mirror lenses, may be prepared as lenses to be exchanged in the present invention.

The rim members 1, the bridge 2 and the temples 5 are made of the same synthetic resin. The temples are shaped in a curve so as to fittingly extend along with an outline of the sides of a wearer's face.

Figure 3:
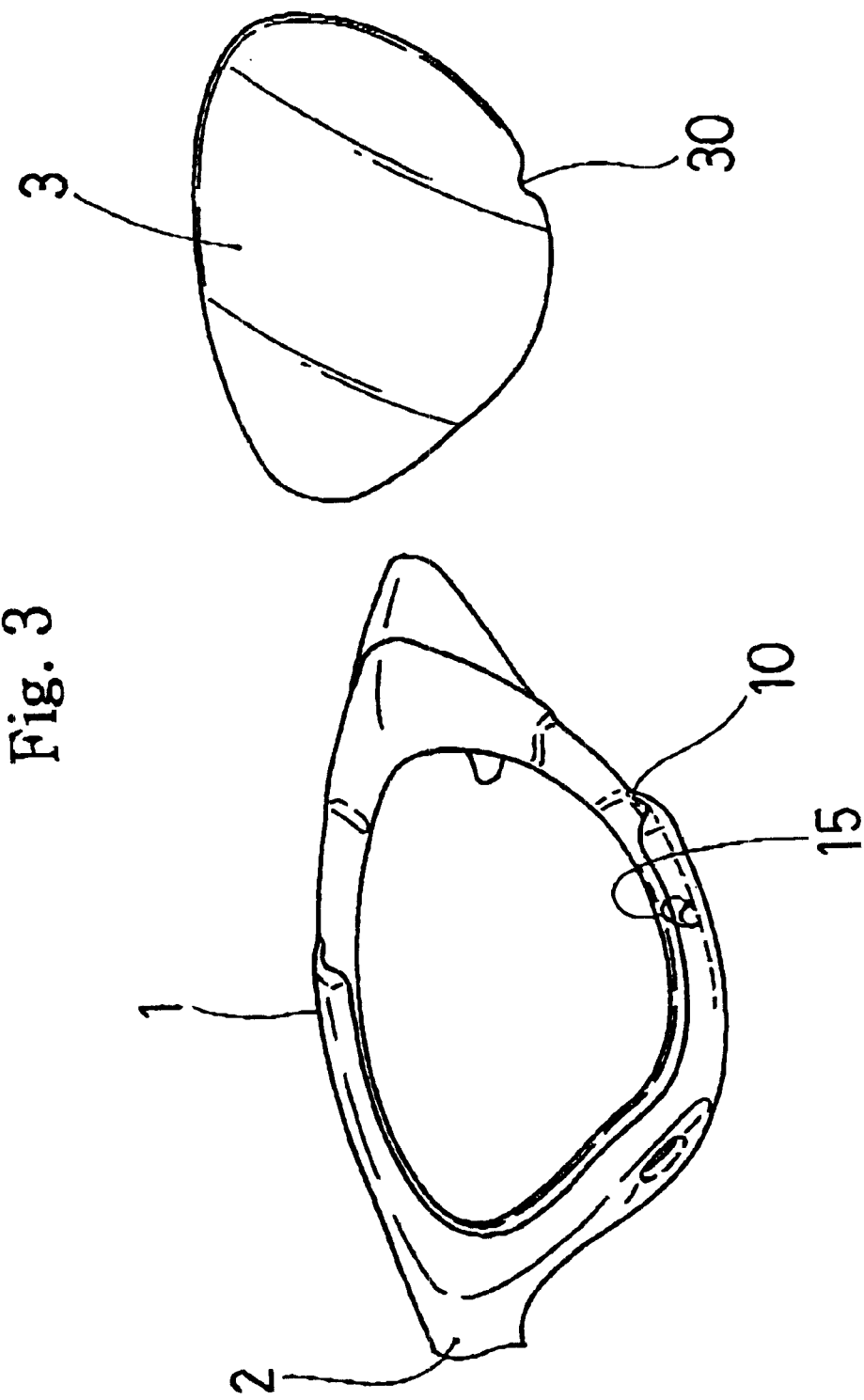
FIG. 3 is a view showing an engaging protrusion provided in a groove formed in a rim member of the sunglasses and an associated notch formed in a lens.

As clearly shown in FIG. 3, in the sunglasses of the embodiment, an engaging protrusion 15 is provided in the groove 10 formed in the rim member 1, and a notch 30 is provided on the lens 3. When the lens 3 is fitted in the rim member 1, the engaging protrusion 30 is engaged with the notch 30 so that this engagement provides resistance at the time of unexpected coming off of the lens 3.

The lenses 3 of the sunglasses are exchanged as follows.

Figure 4:
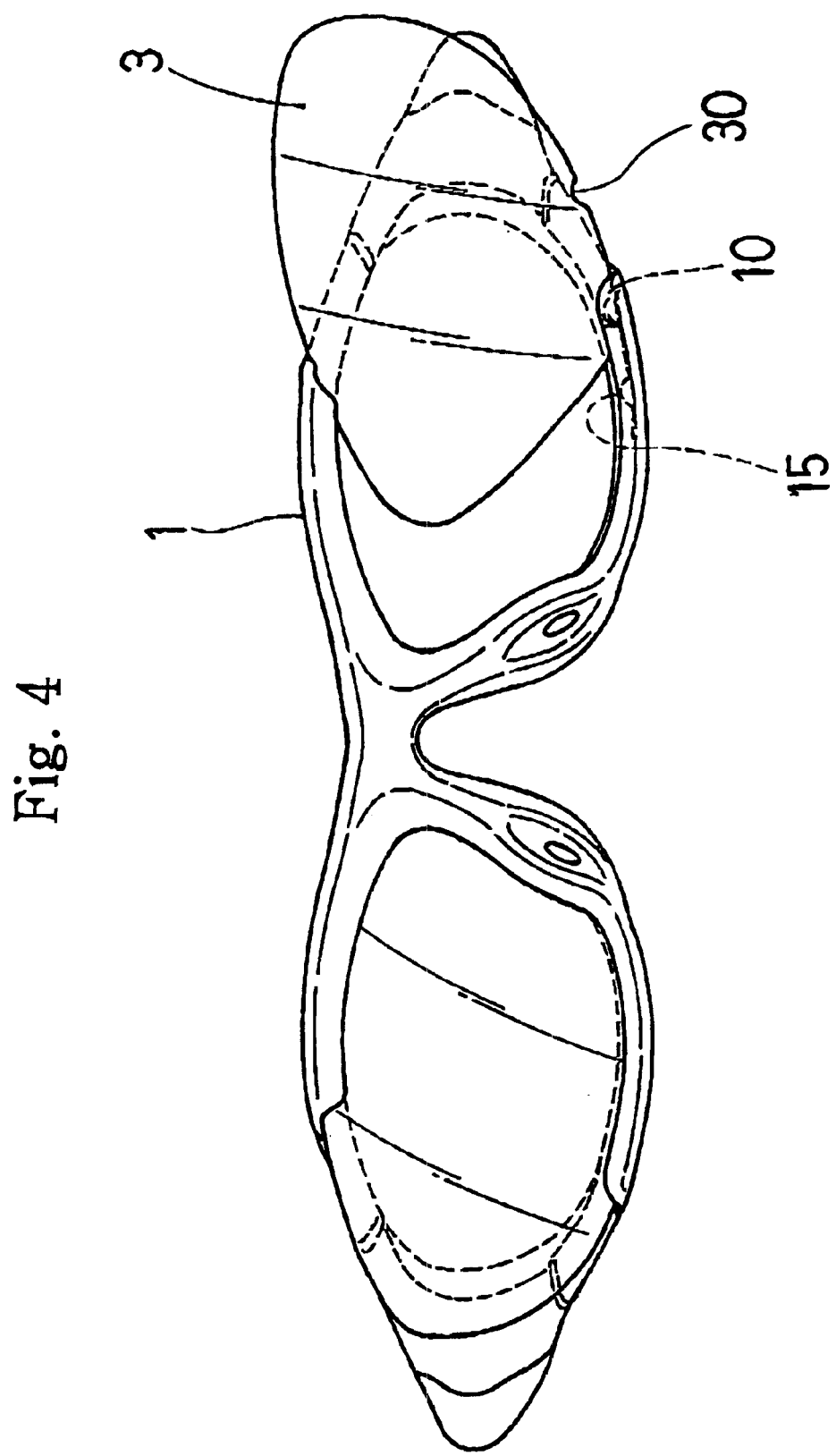
FIG. 4 is a front view showing a state in which the lens is being detached from the rim member.

(1) When the lens 3 fitted in the rim member 1 being given a force to shift laterally outwards by being taken between two fingers (or a finger and a thumb), the engagement between the notch 30 and the engaging protrusion 15 is released. And as shown in FIG. 4, the lens changes its posture in which the outside portion is lifted. Being shifted further, the lens removes from the rim member 1.

(2) On the contrary, when the lens 3 being taken between two fingers, slightly inserted in the groove 10 and given an inward push, the notch 30 and the engaging protrusion 15 become in an engaging state and the lens 3 is fitted in the rim member 1.

(3) As stated above, the sunglasses of the present invention enable an easy exchange of lenses.

In the sunglasses, the lens would not come out unexpectedly from the rim member 1 due to the following reasons. In the sunglasses of the present invention, the lens 3 is held within the groove 10 by a wider area compared with that in the conventional sunglasses stated in the section of the background of the invention. Especially at the lower area of the rim 1, the groove covers about two thirds of the width of the lower edge portion of the lens 3. In addition, when the lens 3 is fitted in the rim member 1, the notch 30 of the lens 3 and the engaging protrusion 15 of the groove 10 are in an engaging state. Therefore, it is obvious that, even under a severe movement, there is only a slight possibility of inadvertent coming off of the lens 3 from the rim member 1.

The sunglasses of the present invention further have the following advantages.

Figure 5:
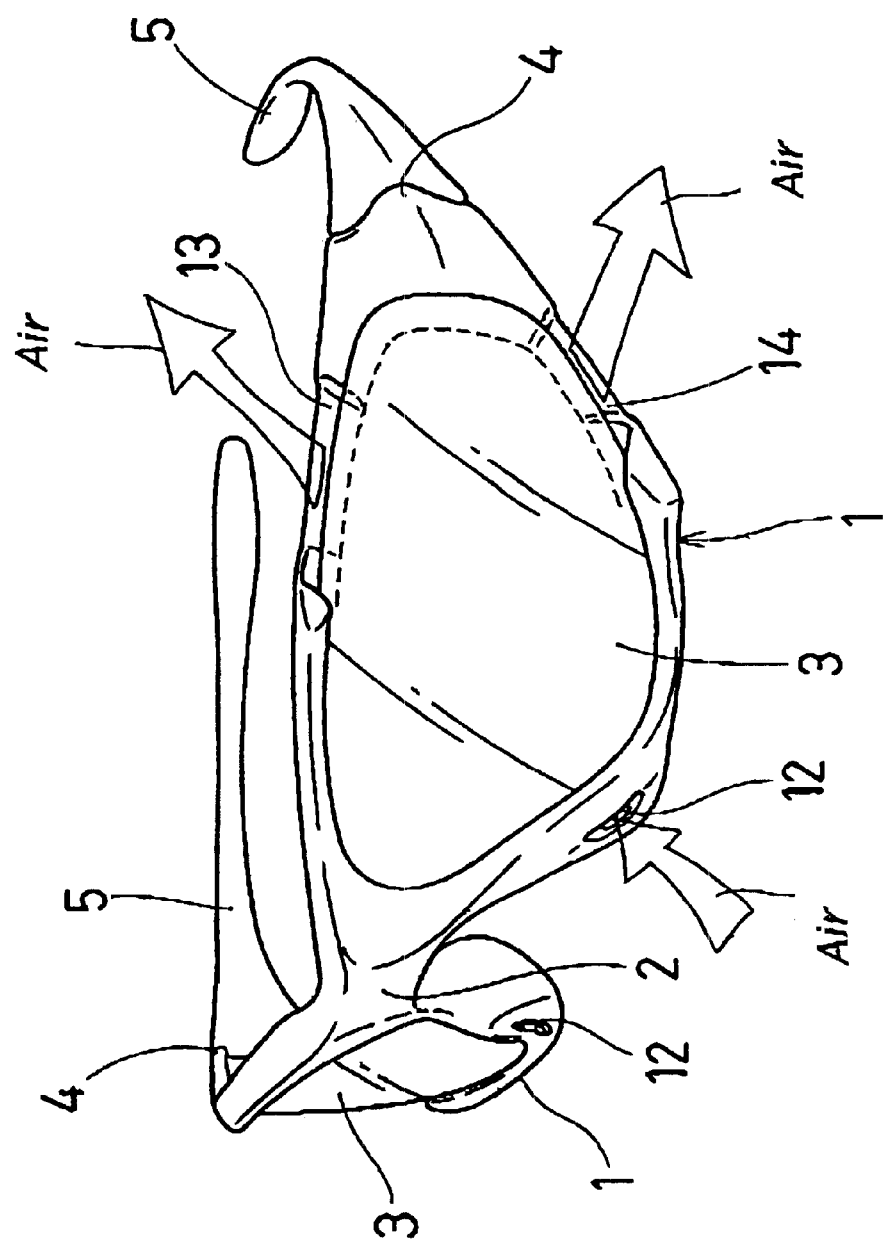
FIG. 5 is a diagram showing the air flow with respect to the sunglasses.
Figure 6:
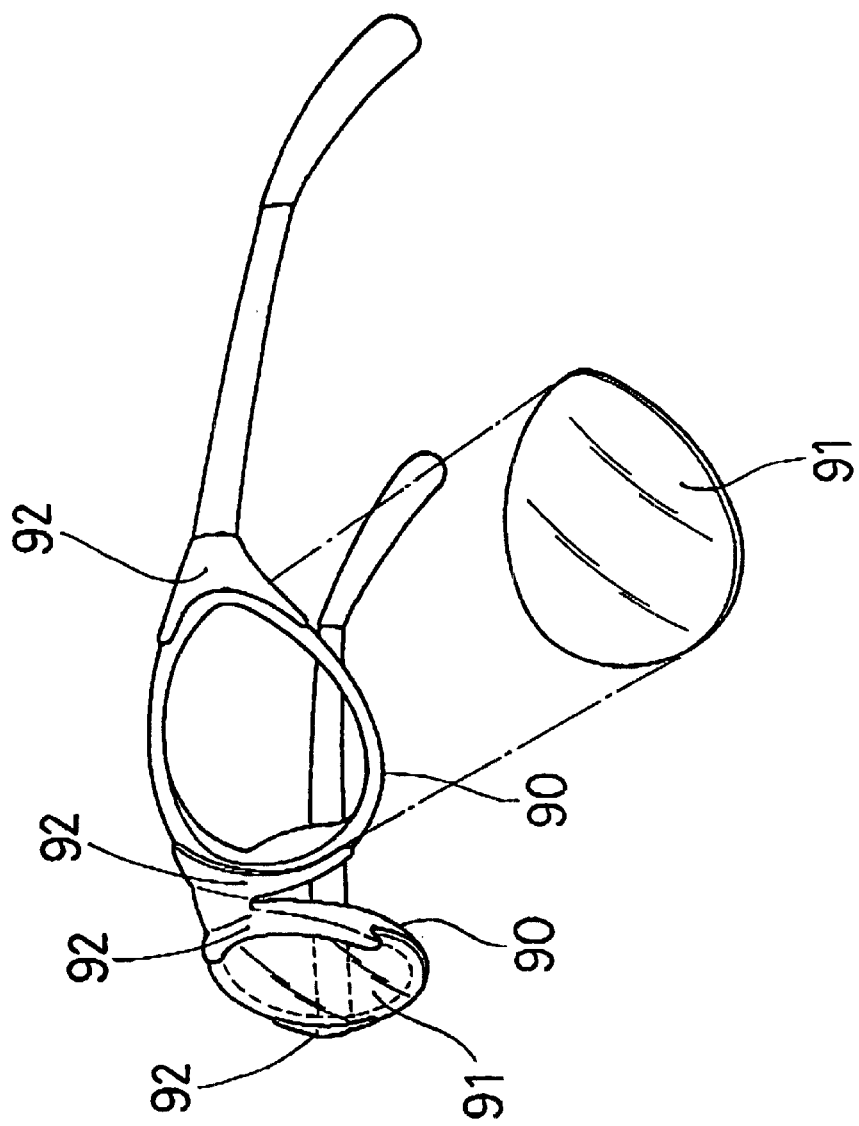
FIG. 6 is a perspective view of a pair of conventional sunglasses.

In case a wearer of the sunglasses of the present invention participates in a speed sport, air from front comes in through the opening 12 as shown by an arrow in FIG. 5, passes through between the lenses 3 and his or her face, and flow out through the cuttings 13 and 14. Therefore, the lenses 3 are free from clouding.

Being constructed as stated above, the present invention provides a pair of eyeglasses in which right and left lenses can be easily exchanged respectively and they are not liable to come off unexpectedly.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Eyeglasses comprising:
   a right rim member and a left rim member, each of them having an inside area, an upper area and a lower area;
   a bridge connecting said right and said left rim members;
   grooves provided in said respective rim members, each of said grooves extending from said inside area to said upper and said lower areas;
   lenses to be attached in said rim members, each of said lenses having an inside edge, an upper edge and a lower edge, being fitted in said rim members in a fashion that said inside, upper and lower edges are inserted in said grooves; and
   wherein said lenses are slidable laterally outwards to be detached from and inwards to be attached to said rim members.

2. Eyeglasses according to claim 1 further comprising;
   a notch provided in each of said lenses;
   an engaging protrusion provided in each of said grooves; and
   wherein an engagement between said notch and said engaging protrusion provides resistance to inadvertent drop off of said lenses.

3. Eyeglasses according to claim 2 wherein each of said rim members is provided with a nose piece and an opening for letting air in and out from between a wearer's face and said lenses.

4. Eyeglasses according to claim 3 wherein each of said rim members is provided with a cutting for discharging said air having being in through said opening, said cutting being provided at a position corresponding to a peripheral area of each of said lenses which is not fitted in said groove.

5. Eyeglasses according to claim 4 wherein said eyeglasses have spherical lenses.

6. Eyeglasses according to claim 3 wherein said eyeglasses have spherical lenses.

7. Eyeglasses according to claim 2 wherein said eyeglasses have spherical lenses.

8. Eyeglasses according to claim 1 wherein each of said rim members is provided with a nose piece and an opening for letting air in and out from between a wearer's face and said lenses.

9. Eyeglasses according to claim 8 wherein each of said rim members is provided with a cutting for discharging said air having been in through said opening, said cutting being provided at a position corresponding to a peripheral area of each of said lenses which is not fitted in said groove.

10. Eyeglasses according to claim 9 wherein said eyeglasses have spherical lenses.

11. Eyeglasses according to claim 8 wherein said eyeglasses have spherical lenses.

12. Eyeglasses according to claim 1 wherein said eyeglasses have spherical lenses.

* * * * *